United States Patent [19]
Maurer et al.

[11] Patent Number: 4,632,223
[45] Date of Patent: Dec. 30, 1986

[54] METHOD AND DEVICE FOR MONITORING LUBRICATION POINTS IN BEARINGS

[75] Inventors: Otto Maurer, Wörth; Werner Schaller, Blieskastel, both of Fed. Rep. of Germany

[73] Assignee: Schaller-Automation Industrielle Automationstechnik KG, Blieskastel, Fed. Rep. of Germany

[21] Appl. No.: 662,951

[22] Filed: Oct. 19, 1984

[30] Foreign Application Priority Data

Oct. 22, 1983 [DE] Fed. Rep. of Germany ....... 3338420

[51] Int. Cl.⁴ ........................ F01M 1/18; F01M 11/10
[52] U.S. Cl. ..................................... 184/6.1; 184/6.4; 184/108
[58] Field of Search .................. 184/6.1, 6.4, 6.5, 108; 340/682, 674, 584; 384/448, 288

[56] References Cited

U.S. PATENT DOCUMENTS

| | | | |
|---|---|---|---|
| 2,502,318 | 3/1950 | Fischer | 184/6.4 |
| 3,108,772 | 10/1963 | Pelino | 340/682 |
| 3,313,156 | 4/1967 | Breen | 340/584 |
| 3,897,116 | 7/1975 | Carpenter | 340/682 |
| 4,167,172 | 9/1979 | Bassoli | 184/6.4 |
| 4,199,718 | 4/1980 | Ikeda | 340/682 |
| 4,326,603 | 4/1982 | Darrow | 184/6.1 |
| 4,354,183 | 10/1982 | Weeks | 340/682 |
| 4,406,169 | 9/1983 | Ikeuchi | 340/682 |

FOREIGN PATENT DOCUMENTS

204909 11/1983 Japan ................................. 184/108

OTHER PUBLICATIONS

Marks, *Standard Handbook for Mechanical Engineers*, McGraw Hill, pp. 16–14, 16–16, 16–17.
Smith, *Circuits, Devices and Systems*, John Wileys & Sons, p. 364 (3rd Edition, 1966).

*Primary Examiner*—Leonard E. Smith
*Assistant Examiner*—Jane E. Obee
*Attorney, Agent, or Firm*—Michael J. Striker

[57] ABSTRACT

In a method and a device for controlling a lubrication film between a bearing surface and a shaft surface of the bearing assembly an electric circuit is provided, interconnected between the shaft and the housing of the bearing, in which a thermoelectric voltage is produced by friction heat which is generated at a contact between the shaft and the bearing when a break in the lubrication film occurs, and which termoelectric voltage is used as a voltage source of the electric circuit.

4 Claims, 5 Drawing Figures

FIG. 4
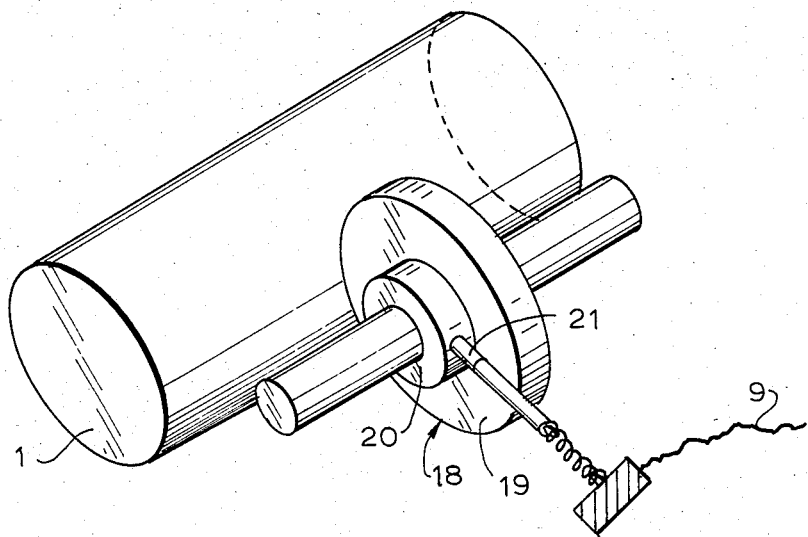
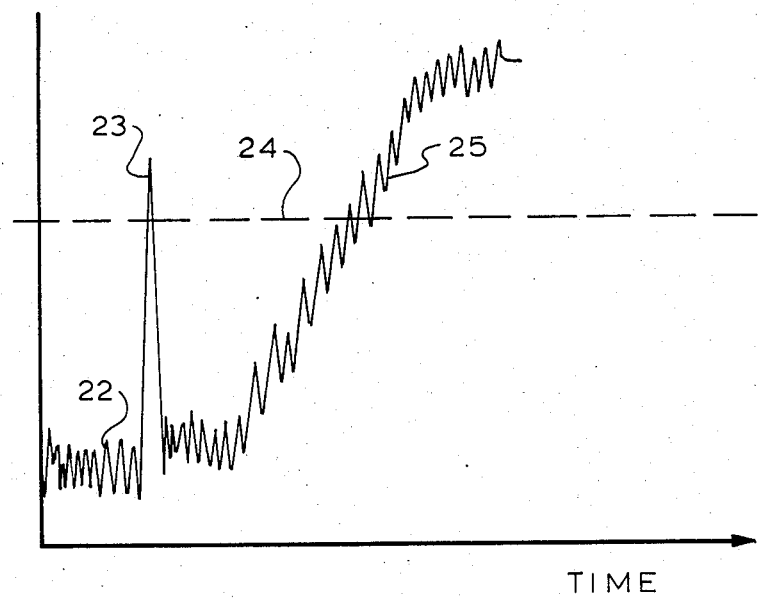
FIG. 5

METHOD AND DEVICE FOR MONITORING LUBRICATION POINTS IN BEARINGS

BACKGROUND OF THE INVENTION

The present invention relates to a method and device for monitoring lubrication at contact points between structural elements movable relative to each other, separated from each other by a lubricant film and formed of different electrically-conductive materials. More particularly, this invention relates to a method and a device for monitoring lubrication points between a rotary shaft and a sleeve bearing.

In monitoring the points of bearing, particularly in the bearings of large machines, such as crank shaft bearings in lop-sided diesel motors it is very important that breaks in a lubrication film be determined before the beginning of damaging the bearing and countermeasures have been suggested to prevent damage to the bearing and the crank shaft and thereby the breakdown of the machine with usual damaging results.

It has been known to connect the shaft and the sleeve bearing in an electric circuit at that location of a lubricant, at which both components are in contact. Such a circuit has been provided with a voltage source and has been used to produce a current resistance as a signal issued when a break in a lubricant film occurs. The voltage source accommodated in an outer connection circuit has produced a current flowing in the circuit through the point of lubrication.

The disadvantage of this conventional monitoring of points of lubrication is that despite the fact that only brief metallic and therefore low-resistance contacts occur between the shaft and the bearing false alarm signals can take place.

These brief low-resistance contacts are noticable when many bearing points are sensed simultaneously. Lubrication oil which contains chemical agents has a certain conductivity whereby it is difficult to differentiate the conductivity of a direct metallic contact from the conductivity of the chemical agents of the oil. Since the circuit during the rotation of the shaft must be connected to the shaft by a wiper and the contact resistance on the wiper can fluctuate the monitoring process becomes more difficult.

It has been also known in a process of points of lubrication being monitored to determine temperatures of the bearings with various temperature sensors and to produce an alarm signal when the temperature has reached a non-permissible high value. Since such temperature sensors can determine only punctual temperatures and these feelers can not be precisely mounted at the enter surface of the bearing for structural reasons this has resulted in a delay in time unless a thermal flow has been transmitted from the spots of damage to the temperature feeler. This is particularly unfavorable when the spot of damage on the bearing is positioned remotely from the temperature sensors.

SUMMARY OF THE INVENTION

It is an object of the present invention to provide an improved method and a device for monitoring lubrication points in a lubrication film between a shaft and a bearing.

It is another object of the present invention to provide for such a monitoring of lubrication films, which would ensure an immediate issuance of an alarm signal upon the occurrence of spots of damage and would prevent false alarm signals.

These and other objects of the present invention are attained by a method of monitoring a lubrication film at contact spots between two structural components movable relative to each other, separated from each other by the lubrication film and formed of electrically-conductive but different materials, particularly between a rotary shaft and a sleeve bearing surrounding said shaft, which are connected in an electrical circuit, comprising the step of using a reduced circuit resistance as a signal which is produced in the circuit upon an occurrence of a break in the lubrication film, wherein a thermoelectric voltage, produced by friction heat occurring between said components in the case of a break in the lubrication film at a spot of contact between said components, is used as a source of voltage in said circuit.

A thermoelement is formed at a contact point, for example in a shaft bearing, by a shaft made of steel and the bearing shell, to the inner surface of which a layer of white metal is applied, whereby the control of lubrication according to this invention substantially protects the device against false alarm signals because this control takes place only when the electric circuit, on the one hand becomes low-resistant due to the occurrence of the break in the lubrication film resulting in the metallic contact between the steel shaft and the white metal of the bearing coating, and, on the other hand, when, due to friction heat occuring at the spot of contact a thermoelectric voltage is generated. Therefore, when these both effects occur together a thermoelectric current is generated in form of an alarm signal in the low-resistant circuit when voltage drops due to a break in the lubrication film.

Because of enormous forces exerted in the bearing great friction forces occur in the bearing when the lubrication film is broken, this causing a great temperature drop because a heat stream produced at a metallic contact between the bearing components can not flow in the components of the bearing as fast as new heat is supplied. Due to this temperature drop the differential thermoelectric voltage and a corresponding signal current flowing through the low-resistance circuit result so that a strong alarm signal is produced in the case of damage of the lubrication film. This signal is generated without any delay because temperature increases exactly at the point of contact, which causes an thermoelectric voltage in the circuit in a sudden manner.

It is assumed in the invention that various metals, which are in contact with each other over a considerably great surface, practically can not form a valuable thermoelement which would generate a utilizable voltage because the temperature generating a thermosignal must prevail over the entire surface of the components positioned in surface contact with each other. Because of unavoidable different temperatures occuring at different points of the great-surface-contact, different thermo-electric voltages will be internally short-circuited. The inventor has been supprised to learn that this is not true at contact points of the bearings because with a great-surface contact of two different materials, for example of the shaft and the sleeve bearing, heat occurs locally in the case of a break of a lubrication film and the lubrication film at the beginning is subjected to small thermal spots so that short circuits at such thermal spots are prevented by a thermoelectric voltage due to an insulation effect of the lubrication film. It is therefore possible that a thermo-electric voltage be used for controlling lubrication spots.

It has been shown that static voltages can also occur in case of a satisfactory lubrication at the spots being controlled. Galvanic voltages are used, which are generated in such a case so that the lubricant forms with various metals of the bearing components a galvanic element. These static voltages take place at high-resistance sources of voltage and can mislead one that thermoelectric voltages are present. In order to eliminate these static voltages it has been suggested in the present invention that the electric circuit which has an outer connection be short-circuited in said outer connection by a low-impedance resistance, the resistance value of which is substantially smaller than that of the electric contact resistance available at an intact spot of the lubrication film. The electric currents which flow from the high-resistance voltage sources to the circuit, are very small and therefore generate a very small voltage drop at the low-impedance resistance of the outer connection of the circuit, this voltage drop being as an insignificant as static voltage. The low-resistance thermoelement therefore generates, in case of a break in the lubrication film, a very high signal current which respectively causes a high voltage drop in the outer connection of the circuit, whereby the ratio of the signal working potential to the static voltage is very high.

According to a further feature of the present invention the method for monitoring lubrication points further includes the steps of continually measuring a potential difference at said low-impedance resistance in said outer connection of the circuit, and releasing an alarm and/or shut-down signal when the potential difference exceeds a predetermined threshold value. If a break occurs in the lubrication film the resulted thermoelectric voltage exceeds a predetermined threshold value and the following release of an alarm signal ensures that countermeasures should be taken before radical damage to the bearings has been done. A shut-down signal for the drive of the movable bearing components can be issued simultaneously with the alarm signal.

According to still another feature of this invention the alarm signal may, upon exceeding said threshold value, be suppressed by voltage peaks occurring for short periods of time unless a predetermined temporary frequency with a tendency of increasing amplitude occurs, so that an additional safety against a false alarm is ensured and only brief and therefore harmless metal contacts between both bearing components generate thermoelectric voltages.

If a number of lubrication spots are to be sensed in the bearing assembly, for example bearing spots of the crank shaft of the multi-cylinder motor or a number of individual bearings in, the motor and transmission, the electric circuit of this invention may include a plurality of branches respectively connected in parallel to the spots being monitored and the alarm signal from a defective bearing will be determined by monitoring and comparing the temperatures of individual bearing spots. In this case the control of all bearings is performed by measuring and comparing temperatures in individual bearings.

According to yet another feature of the invention the objects of the invention are attained by a device for monitoring a lubrication film at contact spots between two structural components movable relative to each other, separated from each other by the lubrication film and formed of electrically-conductive but different materials, particularly between a rotary shaft and a sleeve bearing surrounding said shaft, comprising an electric circuit interconnected between said components and having an outer connection portion, a reduced circuit resistance of which resulted upon an occurrence of a break in the lubrication film is used as a signal; and a bearing housing; said circuit including at least one wire of the material different from those of said components, said wire having one end connected to said housing and another end connected to a stationary portion of a sleeve bearing, whereby a thermoelectric voltage is produced by friction heat occurring between said components in the case of a break in the lubrication film at a spot of contact between said components, said voltage being used as a source of voltage in said circuit. An alarm signal which is generated in the copper wire of one of the bearings produces a signal current which is insignificantly greater than that in the other bearings and which can be directly used for the indication of the spot of damage.

When lubrication spots are controlled in the shaft bearing assemblies the electric circuit is normally connected to the rotating shaft by wipers. Since these wipers are subject to undesired wear, particularly at high number of revolutions of the shaft it is further suggested that the device of the invention includes a stepped wheel for connecting said circuit to a shaft, said wheel having a greater portion which rolls on an outer surface of the shaft and a smaller portion, and the sliding contact or wiper will be then connected to the said circuit and be engaged with said smaller portion of said wheel. By means of this electrically-conductive stepped wheel a peripheral speed at the sliding contact can be significantly reduced so that wear and resulting electric resistance changes on the sliding contact will be maintained very low.

The control device of this invention may further include an amplifier connected to the electric circuit, said amplifier generating a positive signal independently from a polarity on said circuit.

Inasmuch as the thermoelectric current flowing in the low-resistance electric circuit can be sufficiently great it is also possible to use a magnetic field of the thermoelectric current for a measuring effect. For this purpose instead of the resistance a low-resistant coil of a relay may be inserted in the outer connection of the electric circuit. This relay is also adjusted so that it operates at a predetermined electric current.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 4 is a perspective view of a pick-up arranged on the shaft and having an electrically-conductive stepped wheel; and FIG. 5 is a graph of the thermoelectric current measured in the circuit of the bearing assembly.

DETAILED DESCRIPTION OF THE PREFERRED EMBODIMENTS

Figure 1:
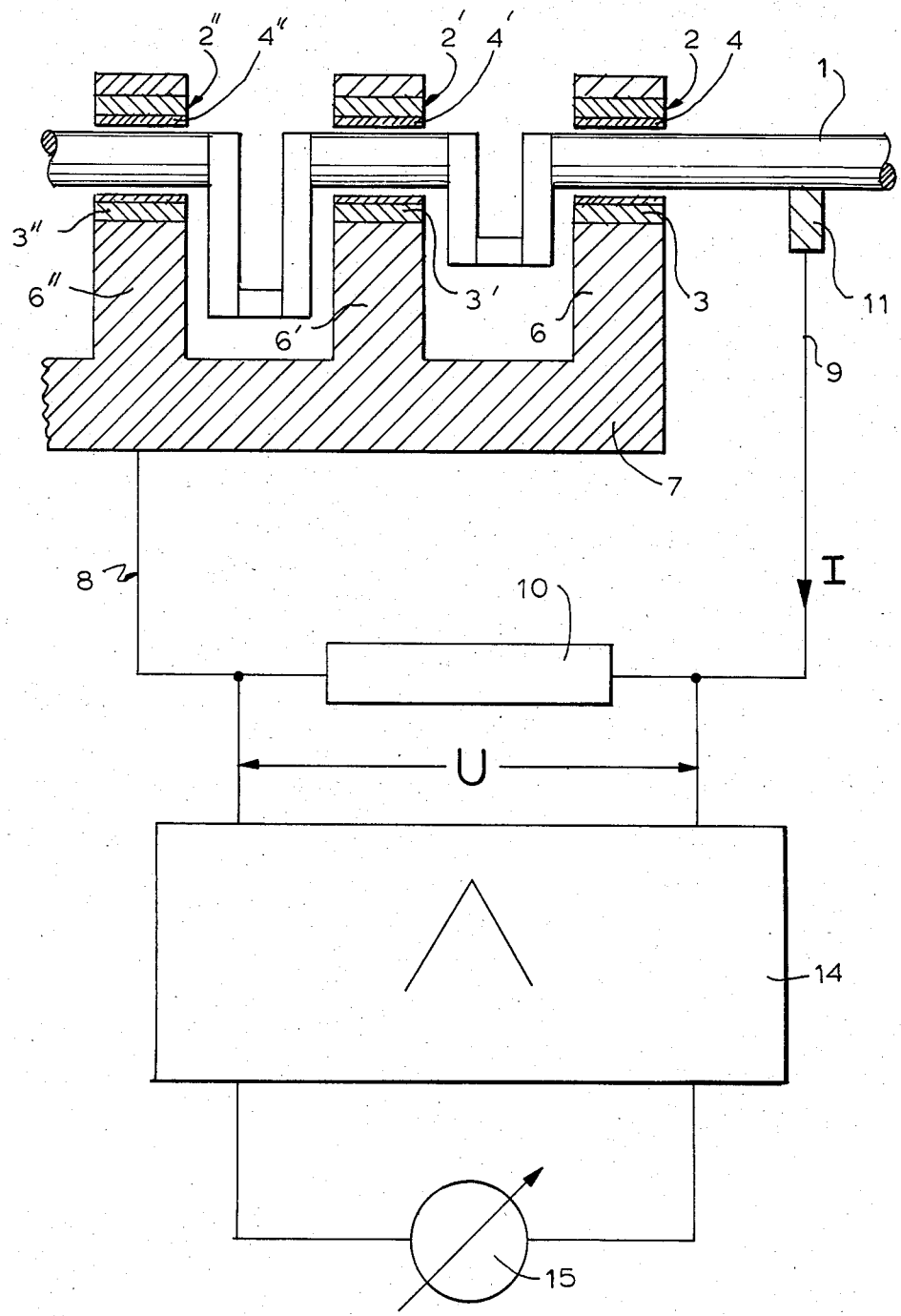
FIG. 1 is a sectional view of a crank shaft bearing assembly of a shaft of a multi-cylinder motor with an electric circuit located externally of the shaft.
Figure 2:
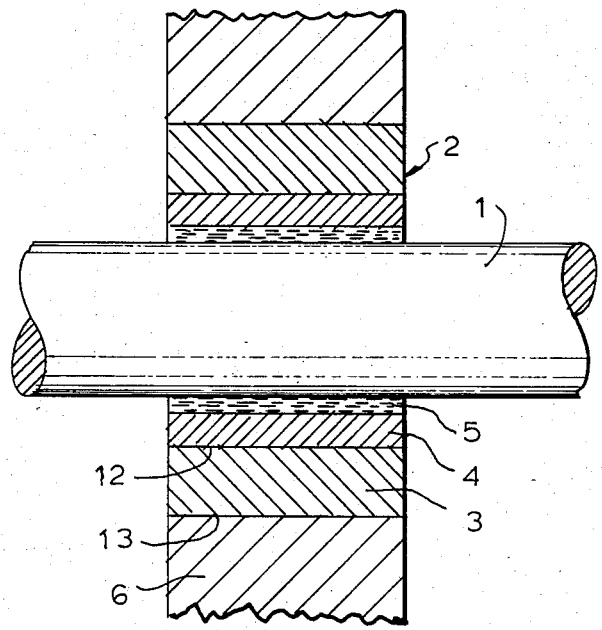
FIG. 2 is a sectional view of a single bearing of FIG. 1 on an enlarged scale.
Figure 3:
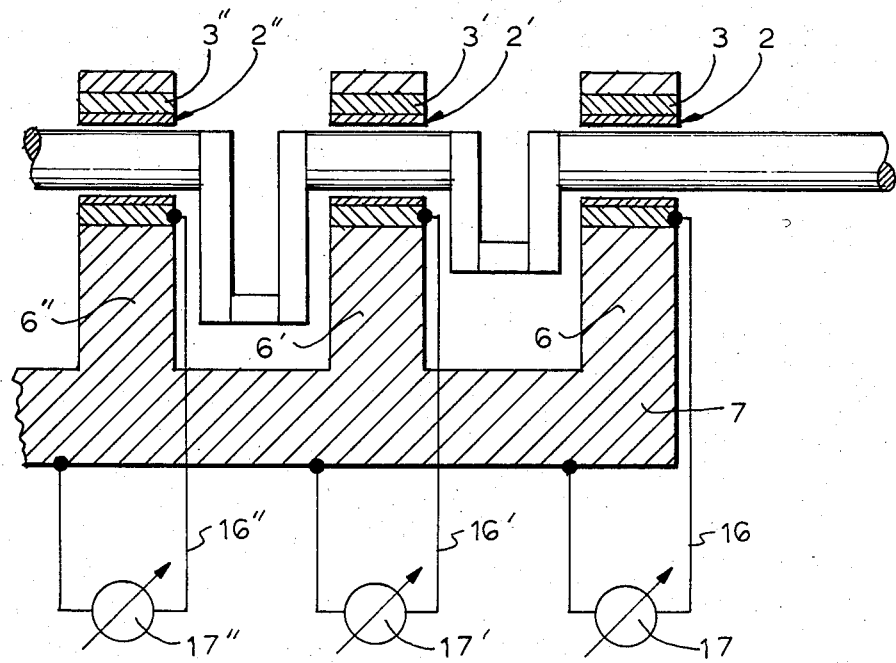
FIG. 3 is a sectional view of the crank shaft with bearings which carry a copper wire for detecting a defective bearing.

Referring now to the drawings in detail, and firstly to FIGS. 1 and 2 thereof, reference numeral 1 designates a crank shaft of a crank drive for a non-illustrated multi-cylinder-piston motor. Crank shaft 1 is journalled in bearings 2, 2' and 2" which include, respectively, bearing sleeves 3, 3' and 3". In order to obtain satisfactory sliding properties the shells of the sliding sleeves are coated at their inner surfaces, facing the shaft 1, with white metal coatings or layers 4, 4' and 4". A lubrication film 5 positioned between each white metal layer and shaft 1 prevents the bearings from overheating. The shells of the bearing sleeves 3, 3', 3" are supported in bearing blocks 6, 6', 6" which are formed in one-piece with a housing 7.

In order to sense the points of lubrication or oil holes 5 the bearings 3, 4 and shaft 1 are all connected in an electric circuit 8 which is also connected to lubrication points 5. Electric circuit 8 is short-circuited via an outer electric connection 9 with a low-impedance resistance 10. The outer electric connection 9 is, on the one hand, clamped to the conductive housing 7, and, on the other hand is connected, via a sliding wiper 11, to the steel shaft 1. All bearing points 5 of bearings 2, 2', 2" can be monitored simultaneously because the circuit 8 has a number of branches connected in parallel. These branches are formed by respective bearing blocks 6, 6' 6" with metal shells of bearing sleeves 3, 3', 3" and white metal layers 4, 4', 4".

If in case of an accidental break-down a break in one of lubrication films takes place the circuit will be low-resistant due to the occurrence of a metal contact between shaft 1 and white metal layer 4 in the circuit branch 6, and consequently friction heat will simultaneously produce between the shaft 1 made of steel and layer 4 made of white metal a high thermoelectric voltage which will be essentially proportional to a friction output. This thermoelectric voltage can increase as a result of thermoelectric voltage generated at the transition zone 12 between the layer of white metal 4 and the bearing shell 3 made of any other metal and also at the transition zone 13 between the bearing shell 3 and the bearing block 6 formed of another metal in dependence upon a heat flow and upon a material pair utilized.

A thermoelectric current I is generated by a thermoelectric voltage in a low resistant circuit 8, which current produces at resistance 10 a potential difference U. This voltage signal is amplified in an amplifier 14 and supplied to an indicator 15, and, upon exceeding a threshold value, generates an alarm signal and eventually a shut-down signal for a motor.

In order to determine as to which bearing has caused an alarm signal, copper wires 16, 16', 16" are respectively connected to bearings 2, 2', 2". Each copper wire 16 has connected in circuit therewith a voltmeter 17, 17', 17". Each copper wire 16 is, at the one side thereof, clamped to the respective bearing shell 3 formed of a different metal, and at another side is connected to the housing 7 at its side remote from the lubrication points 5, whereby each copper wire forms a thermoelement circuit. Now due to a temperature differential an insignificant signal current flows only in the copper wire circuit which is connected to the bearing that has caused an alarm; that insignificant signal current will immediately indicate the location of damage on the indicator.

In the exemplified embodiment illustrated in FIG. 4 an electrically conductive stepped wheel 18 rolls with its larger step portion 19 on the periphery of shaft 1 while its smallest step portion 20 is engaged with a sliding contact or wiper 21 which is spring-biased. The wiper 21 is connected with the outer circuit connection 9 of circuit 8 and produces an electrical connection of this circuit with shaft 1 via the outer surface of wheel portion 19.

With reference to FIG. 5 it will be seen from the graph that a thermoelectric current, produced in the circuit of the bearing can be observed, which in case of a perfect lubrication film in the bearing is a very small current 22 in circuit 8, this current leads to static voltage. If a brief and therefore non-damaging metallic contact occurs between the white metal layer 4 and shaft 1 then a brief current peak 23 will supress that contact with the exceeding of the threshold value 24. If the lubrication film breaks the current peaks will accumulate and the thermoelectric current will sharply rise correspondingly to a characteristic curve 25 so that an alarm signal will be produced by the exceeding of threshold value 24.

If further heat development is picked-up by the receivers at the bearing points the thermoelectric voltage or thermoelectric current returns back to an initial value very quickly whereby the insertion of additional lubrication can be readily detected. As has been proven by research the increase in bearing temperature itself has no effect on thermoelectric voltage in the bearing circuit.

It will be understood that each of the elements described above, or two or more together, may also find a useful application in other types of methods and devices for controlling a lubrication film in bearings differing from the types described above.

While the invention has been illustrated and described as embodied in a method and a device for controlling a lubrication film in bearings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for monitoring a lubrication film at contact spots between a rotary shaft of one electrically conductive material and a sleeve bearing of another electrically conductive material and insulated from said shaft by the lubrication film, comprising an electric circuit including a wiper contact connected to said shaft, said lubrication film, said sleeve bearing, a bearing housing and an outer connection lead connected to said wiper so as to close said electric circuit; said bearing sleeve having two bearing shells, said rotary shaft forming with said bearing shells a junction of a thermo-electric element which, upon occurrence of a break in said lubrication film at said contact spots, generates by friction heat, occurring between said shaft and said sleeve, a thermoelectric voltage differential which causes a signal current in said electric circuit, said current being used as an alarm or shut-down signal, said electric circuit further including a low-impedance resistance connected in said outer connection lead, a resistance value of said resistance being substantially smaller than that of an electric contact resistance between said shaft and said bearing sleeve at a contact spot of the lubrication film.

2. The device as defined in claim 1, further including means for measuring a potential difference at said low-impedance resistance, and an alarm and shut-down transmitter connected to said means and releasing an alarm or shut-down signal when the potential difference exceeds a predetermined threshold value.

3. The device as defined in claim 1, wherein a plurality of such sleeve bearings are provided for simultaneously monitoring a plurality of spots of the lubrication film, said circuit including a plurality of branches respectively connected in parallel to the spots being monitored and being interconnected between the machine housing and a respective sleeve bearing.

4. The device as defined in claim 3, further including temperature indicators each provided in a respective branch and connected to a respective sleeve bearing.

* * * * *